United States Patent
Lin

(10) Patent No.: US 7,330,569 B2
(45) Date of Patent: Feb. 12, 2008

(54) MEASUREMENT METHOD USING BLURRED IMAGES

(76) Inventor: Huei-Yung Lin, 3f-2, No. 167, Chen-Cuo-Liao, San-Hsing Village, Min-Hsiung Township, Chia Yi County 621 (TW)

( * ) Notice: Subject to any disclaimer, the term of this patent is extended or adjusted under 35 U.S.C. 154(b) by 583 days.

(21) Appl. No.: 11/023,472

(22) Filed: Dec. 29, 2004

(65) Prior Publication Data

US 2006/0078164 A1    Apr. 13, 2006

(30) Foreign Application Priority Data

Oct. 8, 2004    (TW) ............... 93130560 A

(51) Int. Cl.
*G06K 9/00*    (2006.01)
(52) U.S. Cl. .................................... 382/107
(58) Field of Classification Search ............. 382/106, 382/107, 255
See application file for complete search history.

(56) References Cited

U.S. PATENT DOCUMENTS

| 3,706,495 | A | * | 12/1972 | Dotson, Jr. | .................. 356/28 |
| 3,878,729 | A | * | 4/1975 | Spalding | ..................... 73/488 |
| 2002/0180876 | A1 | * | 12/2002 | Sobol | ......................... 348/296 |

* cited by examiner

*Primary Examiner*—Matthew C. Bella
*Assistant Examiner*—Tom Y Lu
(74) *Attorney, Agent, or Firm*—Rosenberg, Klein & Lee

(57) ABSTRACT

A speed measurement method using blurred images is for calculating the speed of moving objects being detected. By an image-capturing device, a blurred image of the detected object is obtained. The blurred image is used to create a deblurred image and obtain a blur extent. The speed of the detected object is then calculated by using the blur extent and the capturing parameters of the image-capturing device. In accordance with the above method, the cost of speed detectors is reduced.

11 Claims, 7 Drawing Sheets

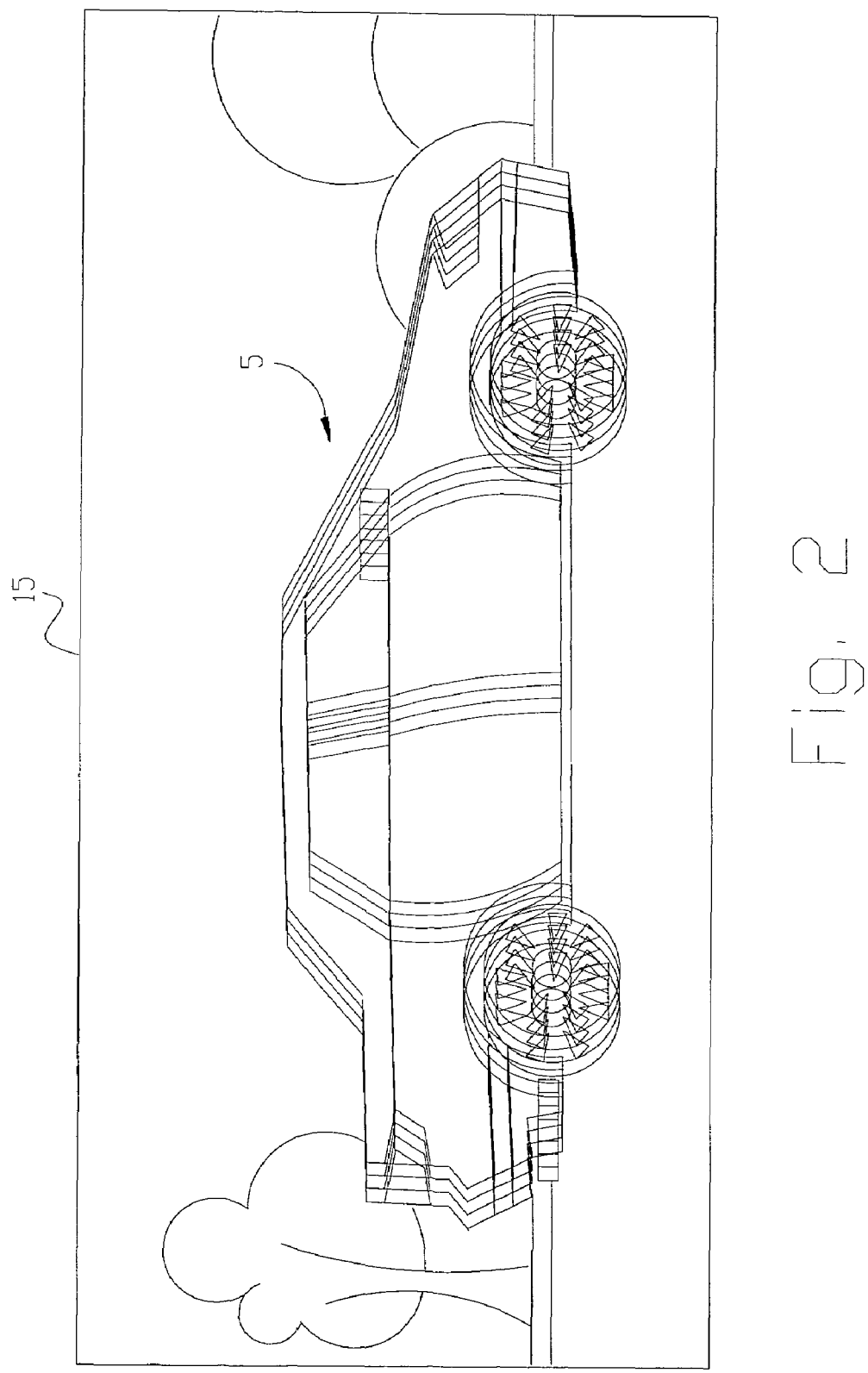

MEASUREMENT METHOD USING BLURRED IMAGES

BACKGROUND OF THE INVENTION

The present invention is related to a speed measurement method; especially to a speed measurement method using blurred images of objects for speed calculation of moving objects so that the cost of the speed detectors can be reduced.

In recent years, because of the advance on the development of various aircrafts, baseball exercise, and electrical devices, people are getting more interested in knowing the speed of flying objects, the pitching speed of sports players, and the speeding of vehicles detected by the law enforcement agencies. Due to the increasing demands of high quality products for speed detection, the development of speed measurement methods varies from traditional single-point measurement to digital image techniques nowadays. Thus, developing a novel, efficient, and low cost speed measurement method is an important issue for both consumer products and the systems used for police staffs.

Currently, most of speed measurement methods are based on Doppler effect. What is Doppler effect? When a fire truck is moving towards you, the sound's pitch is getting higher as the fire truck is close to you, and getting lower as the fire truck is away from you. This is the so-called Doppler effect. Take acoustic waves as another example, suppose the waves with wavelength $\lambda$, and frequency $f$, are emitted from a source toward an observer, the stationary observer receives the acoustic waves with the frequency higher than $f$ and the wavelength shorter than $\lambda$. That is, the pitch received by the observer is getting higher. On the other hand, as the source moves away from the observer, the observer receives the acoustic waves with the frequency lower than $f$ and the wavelength longer than $\lambda$, therefore the pitch is getting lower.

Refer to U.S. Pat. No. 5,814,732, a laser Doppler speed measuring apparatus is disclosed. The speed measuring method includes a laser detector and a demodulator. By a pulse with a fixed frequency emitted from the laser detector toward the motion object, the laser receives reflected pulse with higher or lower frequency according to the Doppler effect. The reflected pulse is then converted to electric signal and processed by the demodulator for the speed calculation of the moving object. One major drawback of this method is that the equipment used in the speed detector implementation is expensive. Moreover, they can be easily detected by anti-detection devices due to the continuously emitted pulse. Thus, this type of speed detectors when used for highway or local traffic speed law enforcement is easily detectable by electronic speed radar detectors.

Therefore, if a speed measurement method based on passive devices is provided, it will be a great advantage in terms of cost and usability of the speed detection apparatus.

SUMMARY OF THE INVENTION

It is a primary objective of the present invention to provide a speed measurement method using blurred images of detected objects by general image-capturing devices to calculate the speed of moving objects. Furthermore, the cost of the speed measurement equipment is reduced.

It is a further objective of the present invention to provide a speed measurement method using blurred images of detected objects by general image-capturing devices to calculate the speed of moving objects. By checking whether the blurred image of the detected object is moving parallel to the horizontal image scanlines, rectify the image if the blurring effect is not parallel to the horizontal image scanlines so as to produce a blurred image with the blurring effect parallel to the horizontal image scanlines. Therefore the speed measurement of the deblurred image of detected object is simplified.

It is still a further objective of the present invention to provide a speed measurement method using blurred images of detected objects by general image-capturing devices to calculate the speed of moving objects and avoid the problem of anti-detection.

In order to achieve the above objectives, a speed measurement method using blurred images in accordance with the present invention is disclosed. The blurred images of the detected object are obtained by general image-capturing devices such as digital cameras, film cameras, camcorders, digital video cameras, or other devices with image-capturing function. The detected objects can be vehicles, baseballs, softballs, tennis balls, aircrafts, athletes, or other moving objects. After obtaining the blurred image, a deblurred image is created and the corresponding blur extent is identified. The speed of the detected object is then calculated using the blur extent of the image and the capturing parameters of the image-capturing device. The method not only measures the speed of the detected objects but also reduces the cost of speed measurement equipment.

Moreover, before acquiring the blur extent of the image, whether the detected object is moving parallel to the horizontal image scanlines is checked. The blurred image without the blur effect parallel to the horizontal image scanlines is rotated first and a deblurred image is created from the rectified blurred image with the blur effect parallel to the horizontal image scanlines.

BRIEF DESCRIPTION OF THE DRAWINGS

The structure and the technical means adopted by the present invention to achieve the above and other objectives can be best understood by referring to the following detailed descriptions of the preferred embodiments and the accompanying drawings, wherein

FIG. 2 is a schematic diagram showing the recording of blurred images of the detected object by the present invention;

DETAILED DESCRIPTION OF THE PREFERRED EMBODIMENT

Most of the conventional methods for speed measurement are achieved by a laser detector that emits a pulse with a fixed frequency. The detector receives the reflected pulse from the detected object and converts it to an electric signal. A demodulator is then used to process the electric signal for the speed calculation of the detected object. This type of methods uses active devices, which are usually more expensive compared to a passive imaging system. Thus, a speed measurement method using blurred images in accordance with the present invention is provided. By using the blurred image of the detected object and the capturing parameters of the image-capturing device, the actual displacement of the detected object is estimated. The speed of the moving object is then calculated by using the actual displacement and the image capturing parameters.

Figure 1:
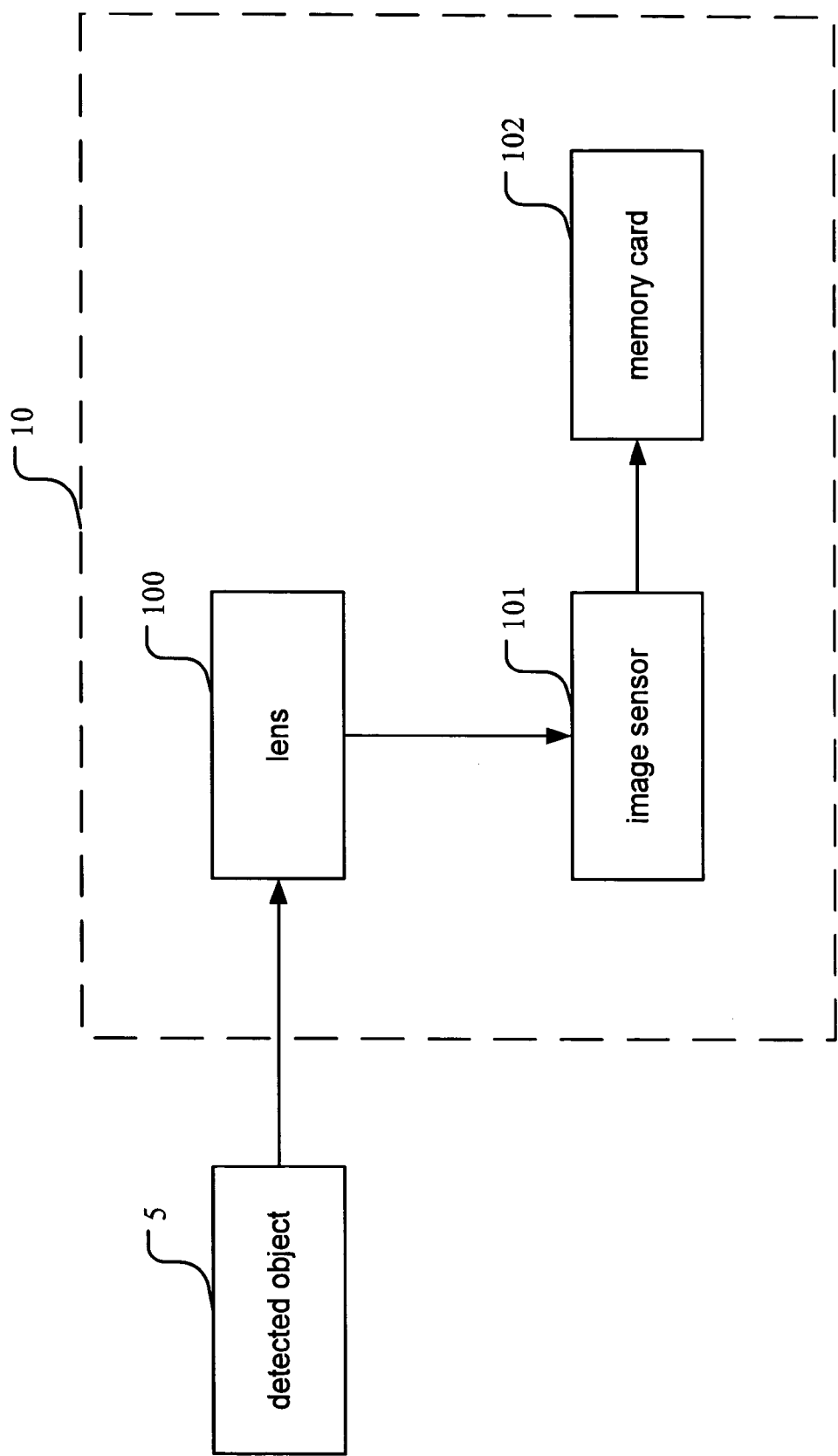
FIG. 1 is a block diagram in accordance with the present invention.

Refer to FIG. 1 & FIG. 2; the present invention includes an image-capturing device 10 for taking a blurred image 15 of a detected object 5. The image-capturing device 10 consists of a lens 100, an image sensor 101, and a memory card 102. The lens 100 is used to receive light signals from the detected object 5. By setting the shutter speed of the image-capturing device 10, the exposure time for the light signals of the detected object 5 arrives the image sensor 101 is controlled. By receiving light signals from the detected object 5 in different positions, the image sensor 101 records an image of the movement trace of the detected object 5 so that there is a blurred image 15. The blurred image 15 produced by the image sensor 101 is then saved in the memory card 102.

The image-capturing device 10 is a digital camera, or a digital video camera recorder such as V8 (Video-8 mm), DV (digital video) or other devices with image-capturing function.

Figure 3A:
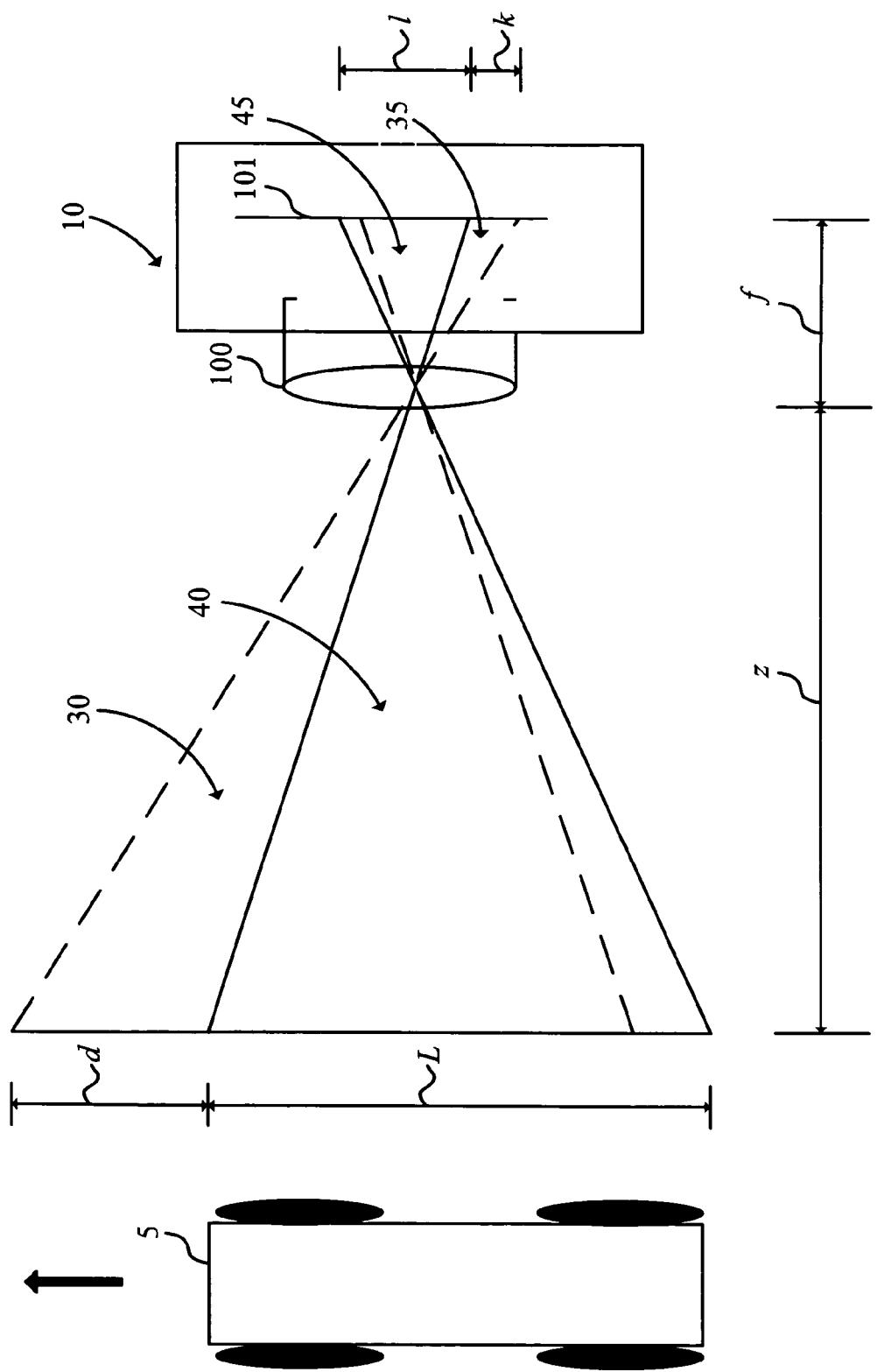
FIG. 3A is a schematic diagram showing the speed measurement using blurred images in accordance with the present invention.

An embodiment of the present invention takes a vehicle as a detected object 5 is disclosed in FIG. 3A. The application of the present invention is not only the speed detection of moving vehicles, but also the speed detection of any object in motion such as baseballs, softballs, tennis balls, aircrafts, athletes, etc. Refer to FIG. 3A, the image-capturing device 10, an object distance z, a focal length (focal length) f, a blur extent k and an actual displacement d are shown in the figure. The image-capturing device 10 includes a lens 100, a shutter and an image sensor 101 for taking the blurred image 15 of the moving object being detected 5. The object distance z is the distance from the lens 100 to the detected object 5; the focal length f is the distance between the lens 100 and the image sensor 101. An image intensity gradient analysis on the image scanlines and image restoration techniques such as Wiener filter are used to identify the blur parameter (in pixel) and create a deblurred image. The blur parameter (in pixel) is the blur extent used for image restoration techniques to obtain the deblurred image from the blurred image 15. The blur extent k (in mm) is calculated by using the blur parameter and the pixel size of the imaging-capturing device. The displacement d is the actual moving distance of the detected object 5.

Figure 3B:
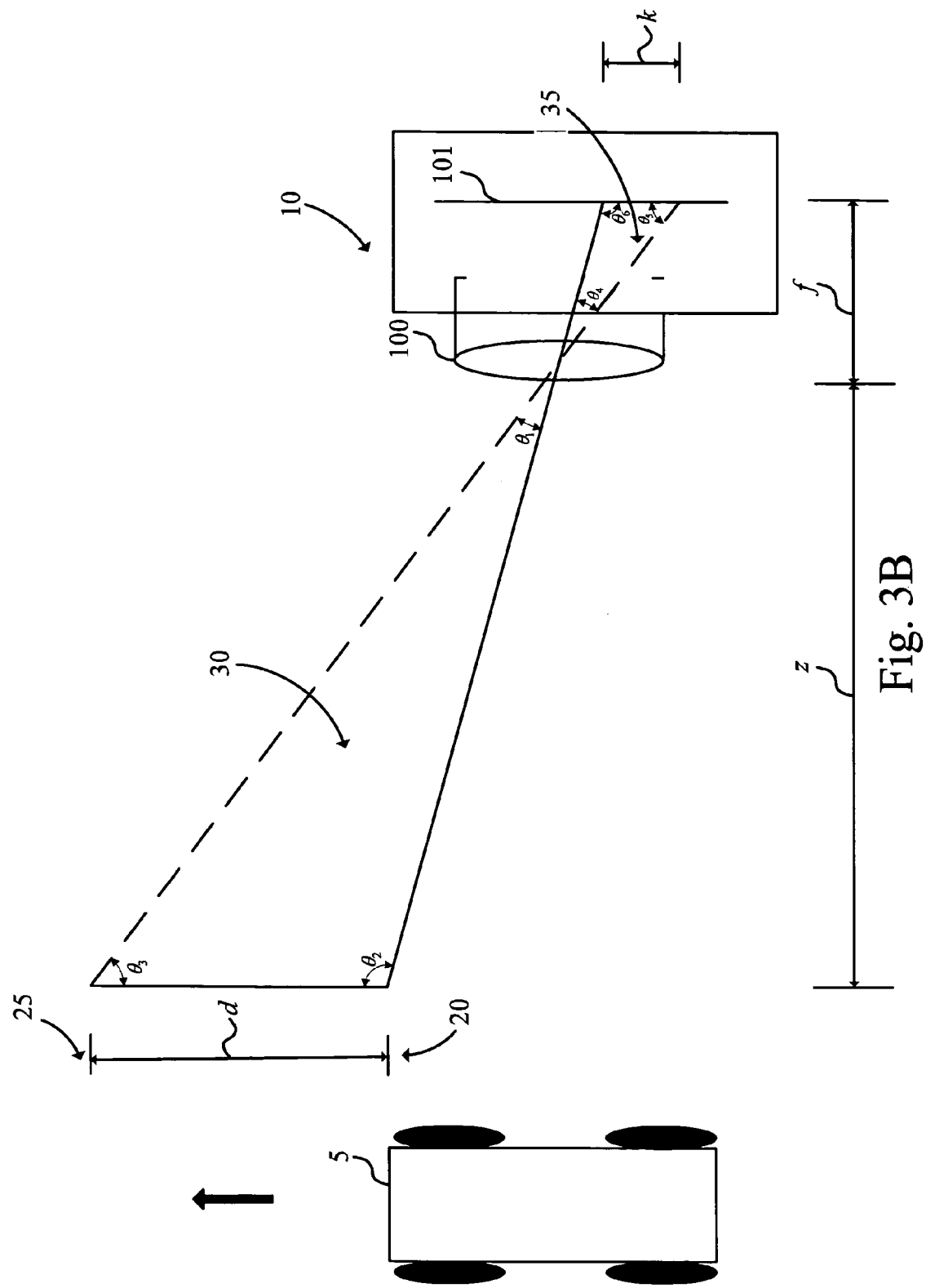
FIG. 3B is a partially enlarged view of FIG. 3A.

Based on the principle of similar triangles, the actual displacement d of the detected object 5 is calculated. Refer to FIG. 3B, which is a partially enlarged view of FIG. 3A, during the exposure time (controlled by the shutter speed of the image-capturing device), the initial signal reflected by the detected object 5 and the terminal signal reflected by the detected object 5 are received by the lens with a shutter 100 inside the image-capturing device 10. The initial signal corresponds to the initial location 20 of the detected object 5 and the terminal signal corresponds to the end location 25 of the detected object 5. The initial signal and the terminal signal cross at the location of the lens 100. The location of the lens 100, the initial location 20 of the detected object 5 and the end location 25 of the detected object 5 form the first virtual triangle 30 with three angles $\theta_1$, $\theta_2$ and $\theta_3$.

Furthermore, the image sensor 101 receives the initial signal and terminal signal reflected from the detected object 5 transmitted through the lens 100. Both the initial and terminal signals form an image at the location of the image sensor 101. The location of the lens 100 and the above images form the second virtual triangle 35 with three angles $\theta_4$, $\theta_5$ and $\theta_6$.

Because the first virtual triangle 30 and the second virtual triangle 35 are formed by the initial signal reflected from the detected object 5 to the image sensor 101 and the terminal signal reflected from the detected object 5 to the image sensor 101, the angle $\theta_1$ is equal to the angle $\theta_4$. Thus, the first virtual triangle 30 is similar to the second virtual triangle 35.

Thus, the relationship of the blur extent k, the actual displacement d, the object distance z, and the focal length f is shown in equation (1) and equation (2).

$$\frac{\text{actual displacement } d}{\text{object distance } z} = \frac{\text{blur extent } k}{\text{focal length } f} \quad (1)$$

$$\text{actual displacement } d = \text{blur extent } k \times \text{object distance } z \div \text{focal length } f \quad (2)$$

$$\text{speed} = \frac{\text{distance}}{\text{time}} \quad (3)$$

The displacement d is acquired by equation (2) and then used in equation (3) to calculate the speed of the detected object 5 with the given shutter speed (exposure time).

Refer to FIG. 3A, the object distance z can be measured physically or calculated by using the principle of similar triangles. Suppose the actual length of the detected object is L and the length of the detected object in the deblurred image is l. If the object being detected is a vehicle, then the actual length L is body length of the vehicle and the length in the deblurred image l is equal to the body length of the vehicle in the image.

The blurred image 15 of the detected object 5 is obtained by the image-capturing device 10, and then used to create a deblurred image by image restoration technique. The actual length of the detected object L is given by the manufacturer's specification after identifying the model of the detected object 5.

Moreover, the deblurred image obtained from the blurred image 15 of the detected object 5 can be though as the image of the detected object 5 with actual length of L captured by the image-capturing device 10. Through the lens 100, the image-capturing device 10 receives the initial signal and terminal signal reflected from the detected object 5 with actual length L and an image is formed in the image sensor 101. Also, the third virtual triangle 40 and the fourth virtual triangle 45 are formed. Based on the principle of similar triangles mentioned above, the third virtual triangle 40 is similar to the fourth virtual triangle 45. Thus equation (4) is used to calculate the object distance z by using the actual length L, the length of the object in the deblurred image l, and the focal length f.

$$\frac{\text{actual length } L}{\text{object distance } z} = \frac{\text{length in the deblurred image } l}{\text{focal length } f} \quad (4)$$

Figure 4:
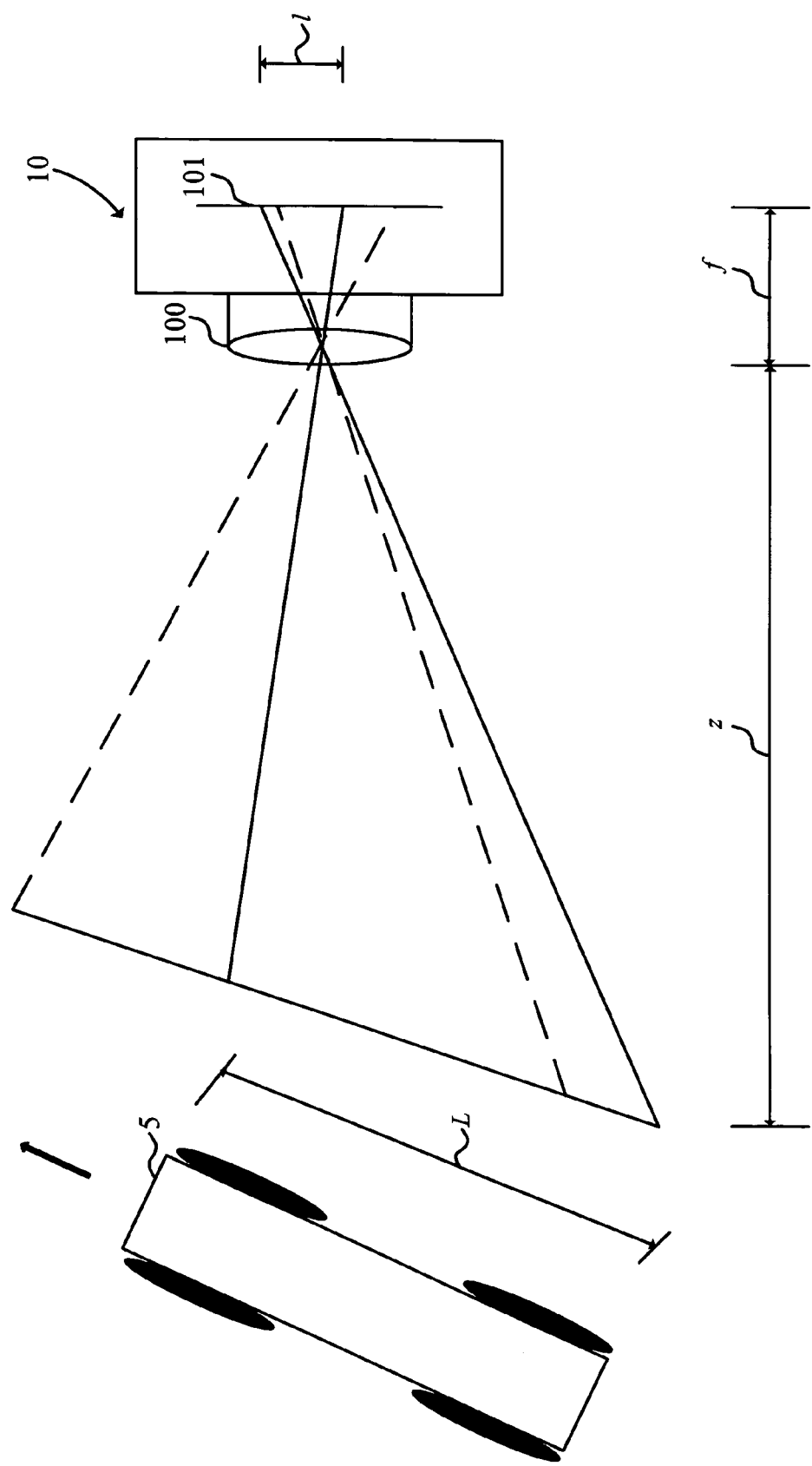
FIG. 4 is a schematic diagram of another embodiment of the present invention.

Refer to FIG. 4, another embodiment of the present invention is disclosed. As shown in the figure, even the detected object is moving at an angle with respect to the viewing direction of the image-capturing device 10, the present invention can still be used to calculate the object distance z and the speed of the detected object 5. If the detected object 5 moves at an inclined angle, the object distance z and the speed of the detected object 5 can still be calculated by the principle of similar triangles mentioned previously.

When a vehicle is moving uphill or downhill, the blurred image 15 captured by the image-capturing device 10 is not parallel to the horizontal image scanlines. Based on the principle that the direction of the blurring effect is the direction with the smallest image intensity gradient, the motion angle of the detected object 5 can be found by calculating the total image intensity gradient for each angle of the blurred image 15 and then identifying the angle with the smallest image intensity gradient. Thus a deblurred image is created according to the motion angle given by the direction of the blurring effect, and a blur parameter is acquired. The blur extent is then calculated by using the blur parameter and the pixel size. Generally speaking, image restoration of the deblurred image is more complicated if a nonzero motion angle is present.

In order to simplify the calculation of the deblurred image, the blurred image 15 is rectified in accordance with the motion angle. If the motion angle is 0°, there is no need to modify the blurred image; otherwise the blurred image 15 with non-horizontal motion direction is rotated in order to make the blurring effect of the blurred image 15 parallel to the horizontal image scanlines. Then a deblurred image with the object moving parallel to the horizontal image scanlines is created from the rectified blurred image and the blur extent is acquired. Thus the calculation of the deblurred image is simplified.

Figure 5:
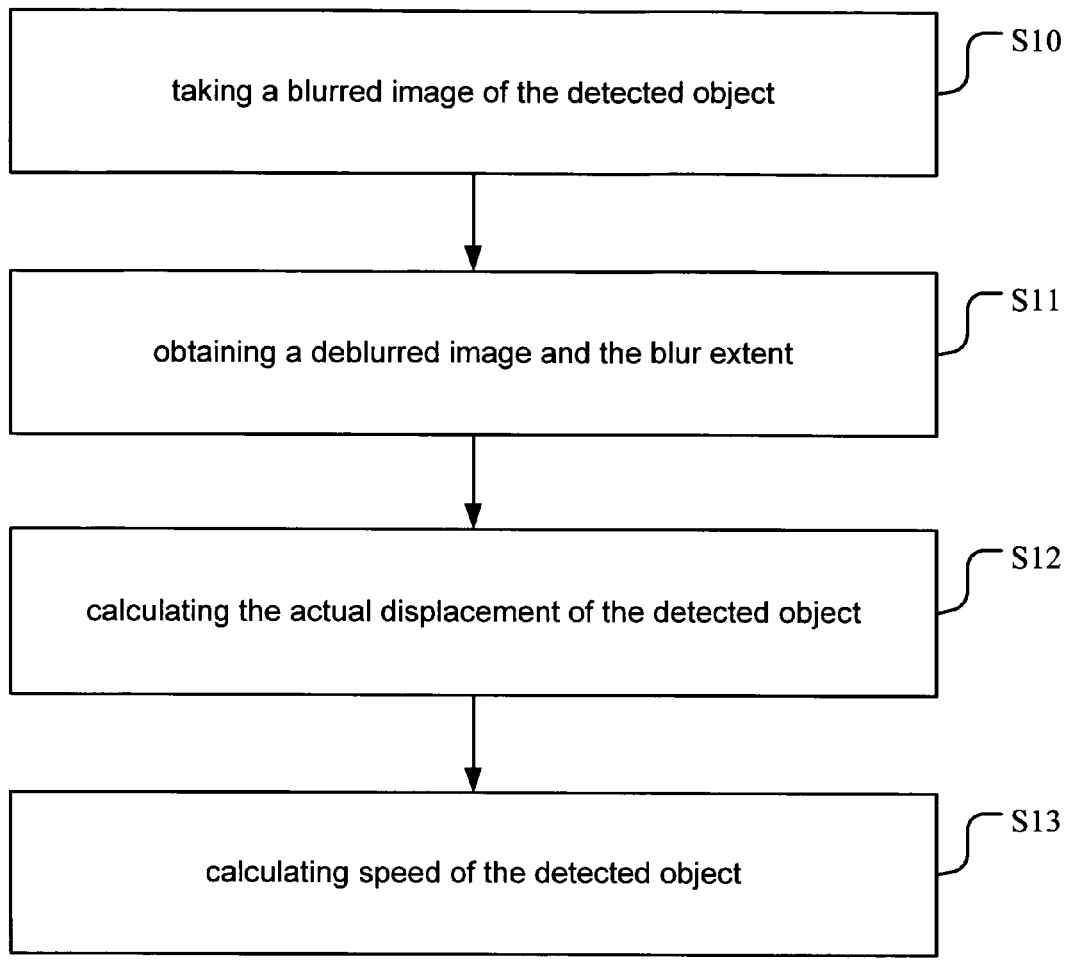
FIG. 5 is a flow chart of a better embodiment in accordance with the present invention.

Refer to FIG. 5, a flow chart of a better embodiment in accordance with the present invention is disclosed. A method according to the present invention is used for calculating the speed of the detected object. The method consists of the following steps:

step10: taking a blurred image of the detected object by the image-capturing device;

step11: using the blurred image to obtain a deblurred image and the blur extent;

step12: calculating the actual displacement of the detected object by using the blur extent, the focal length of the image-capturing device and the object distance; and step13: calculating speed of the detected object by the actual displacement and the shutter time of the image-capturing device.

Figure 6:
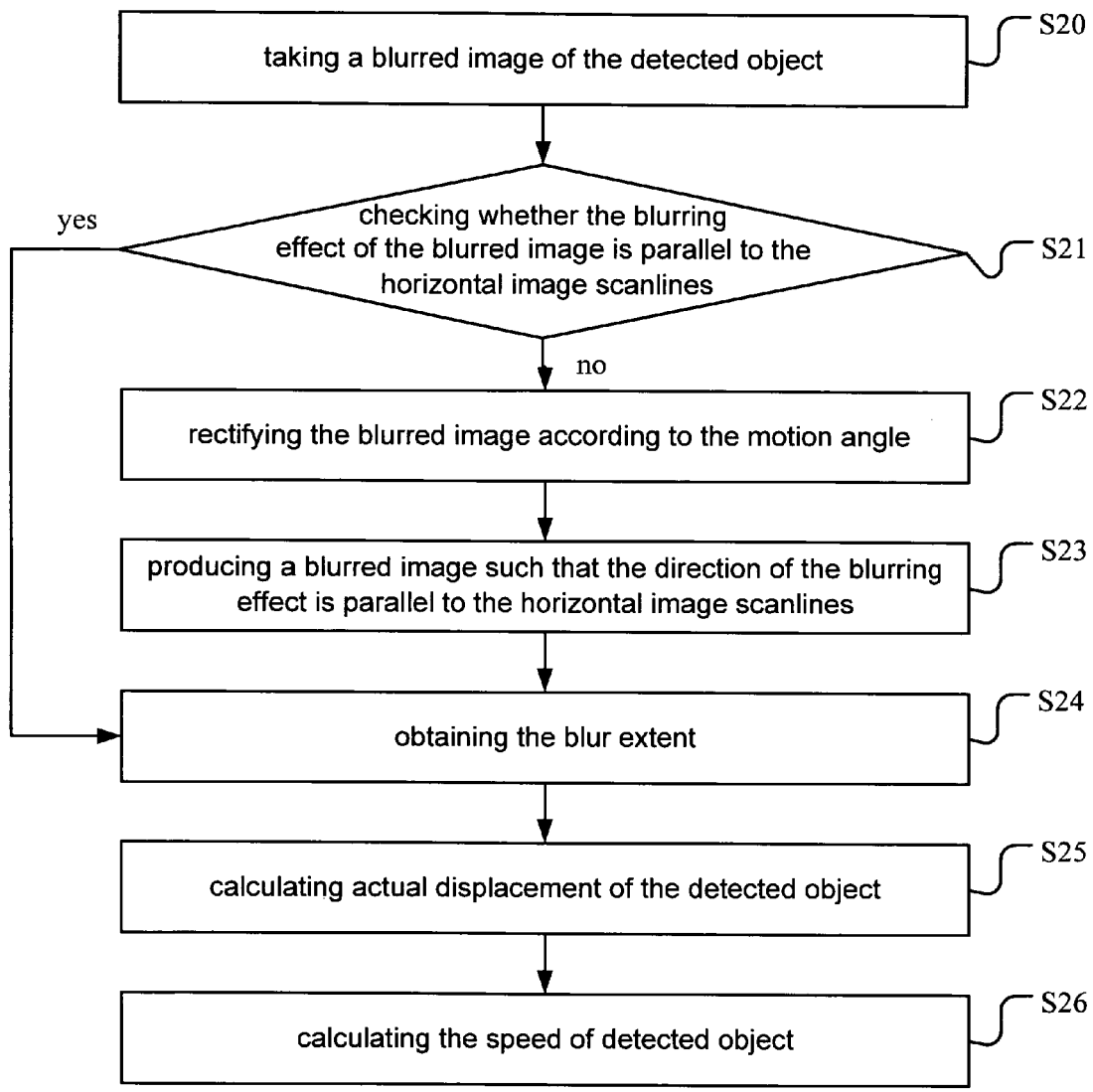
FIG. 6 is a flow chart of another embodiment in accordance with the present invention.

Refer to FIG. 6, a flow chart of another better embodiment in accordance with the present invention is disclosed. A method according to the present invention is used for calculating the speed of the detected object. The method consists of the following steps:

Step20: taking a blurred image of the detected object

Step21: checking whether the blurring effect of the blurred image is parallel to the horizontal image scanlines by calculating total image intensity gradient for each angle of the blurred image and finding the angle with the smallest image intensity gradient that is a motion angle of the detected object; if the motion angle is 0°, jump to the step S24, otherwise continue to execute S22;

Step22: rectifying the blurred image according to the motion angle;

Step23: producing a blurred image such that the direction of the blurring effect is parallel to the horizontal image scanlines;

Step24: producing a deblurred image from the blurred image and obtaining the blur extent;

Step25: calculating actual displacement of the detected object by the blur extent, the focal length of the image-capturing device and the object distance.

Step26: calculating the speed of detected object by the actual displacement and the shutter time of the image-capturing device.

In summary, the present invention measures the speed of moving objects by using blurred images. By a general image-capturing device, an image of the detected object is captured. When the motion direction of the detected object in the captured blurred image is not parallel to the horizontal image scanlines, rectify the blurred image such that the motion direction of the detected object parallel to the horizontal image scanlines. The rectified image is then used to produce a deblurred image and identify the blur extent by image restoration techniques and intensity gradient analysis. The speed of the detected object is then calculated by the actual displacement of the detected object and the shutter time of the image-capturing device based on the principle of similar triangles. Therefore, the speed of detected objects is measured by blur images and the cost for speed detectors is reduced.

In addition, compared to the conventional speed detectors emitting pulse with a fixed frequency for detecting the speed of moving objects, the present invention calculates the speed of the detected object using the shutter time of an image-capturing device and a blurred image of the detected object. Therefore, the present invention avoids the shortcomings of being detected.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A speed measurement method using blurred images for detecting the speed of a detected object comprising the following steps:

taking a blurred image of the detected object by an image-capturing device;

using the blurred image to create a deblurred image and obtain a blur extent;

calculating an actual displacement of the detected object by using the blur extent, a focal length of the image-capturing device and a distance between the detected object and the image-capturing device; and calculating the speed of the detected object using the actual displacement of the detected object and a shutter time of the image-capturing device.

2. The speed measurement method using blurred images as claimed in claim 1, wherein following steps are further included prior to the step of using the blurred image to create a deblurred image:

checking whether the motion direction of the detected object in the blurred image is parallel to the horizontal image scanlines;

rectifying the blurred image such that the direction of the blurring effect is parallel to the horizontal image scanlines; and producing a blurred image with the detected object moving parallel to the horizontal image scanlines.

3. The speed measurement method using blurred images as claimed in claim 2, wherein the step of checking whether the detected object in the blurred image is moving parallel to the horizontal image scanlines further having the following steps:
  calculating the image intensity gradient for each angle of the blurred image; and
  comparing the image intensity gradient of each angle to obtain a motion angle of the detected object, and rectify the blurred image according to the motion angle.

4. The speed measurement method using blurred images as claimed in claim 1, wherein following steps are further included prior to the step of using the blurred image to create a deblurred image:
  checking whether the detected object in the blurred image is moving parallel to the horizontal image scanlines;
  calculating the image intensity gradient of each angle of the blurred image, wherein the blurred image isn't parallel the horizontal image scanlines; and
  comparing the image intensity gradient of each angle to obtain a motion angle of the detected object, and then produce a deblurred image according to the motion angle.

5. The speed measurement method using blurred images as claimed in claim 1, wherein the step of using the blurred image to create a deblurred image and obtain a blur extent further having the following steps:
  acquiring a blur parameter of the deblurred image and a pixel size of the blurred image; and
  calculating the blur extent by using the blur parameter and the pixel size.

6. A speed measurement method using blurred images for detecting the speed of a detected object comprising the following steps:
  taking a blurred image of the detected object by an image-capturing device;
  using the blurred image to create a deblurred image and obtain a blur extent;
  calculating an actual displacement of the detected object by using the blur extent and the capturing parameters of the image-capturing device; and
  calculating the speed of the detected object by the actual displacement and the capturing parameters.

7. The speed measurement method using blurred images as claimed in claim 6, wherein following steps are further included prior to the step of using the blurred image to obtain a deblurred image:
  checking whether the motion direction of the detected object in the blurred image is parallel to the horizontal image scanlines;
  rectifying the blurred image such that the direction of the blur effect is parallel to the horizontal image scanlines; and
  producing a blurred image with the detected object moving parallel to the horizontal image scanlines.

8. The speed measurement method using blurred images as claimed in claim 7, wherein the step of checking whether the detected object in the blurred image is parallel to the horizontal image scanlines further having the following steps:
  calculating the image intensity gradient of each angle of the blurred image; and
  comparing the image intensity gradient of each angle to obtain a motion angle of the detected object, and rectify the blurred image according to the motion angle.

9. The speed measurement method using blurred images as claimed in claim 6, wherein following steps are further included prior to the step of using the blurred image to obtain a deblurred image:
  checking whether the detected object in the blurred image is parallel to the horizontal image scanlines;
  calculating the image intensity gradient of each angle of the blurred image, wherein the blurred image isn't parallel the horizontal image scanlines; and
  comparing the image intensity gradient of each angle to obtain a motion angle of the detected object, and then produce a deblurred image according to the motion angle.

10. The speed measurement method using blurred images as claimed in claim 6, wherein the step of using the blurred image to create a deblurred image and obtain a blur extent further having the following steps:
  acquiring a blur parameter of the deblurred image and a pixel size of the blurred image; and
  calculating the blur extent by using the blur parameter and the pixel size.

11. The speed measurement method using blurred images as claimed in claim 6, wherein the step of taking a blurred image of a detected object by an image-capturing device further having a step:
  acquiring the capturing parameters of the image-capturing device; the capturing parameters include a shutter time, a focal length and an object distance.

* * * * *